March 22, 1932.  H. D. HUKILL  1,850,626
LOW PRESSURE WARNING DEVICE
Filed Sept. 16, 1929
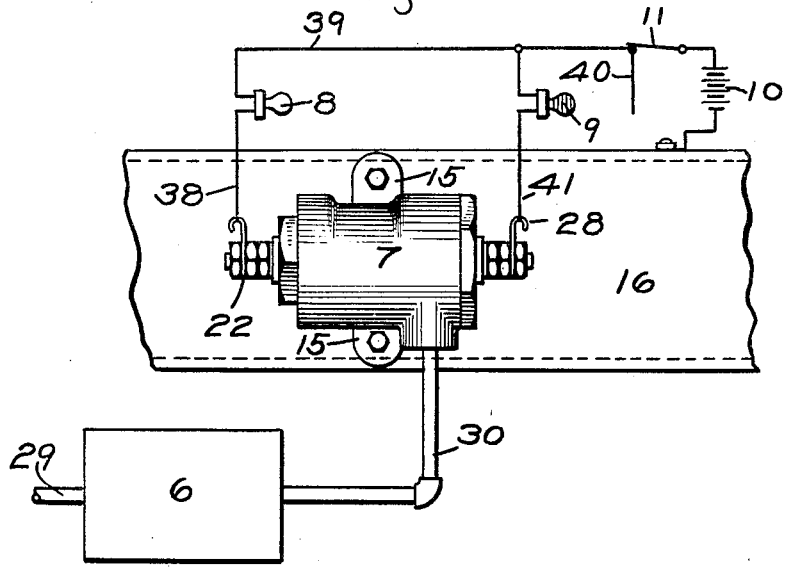
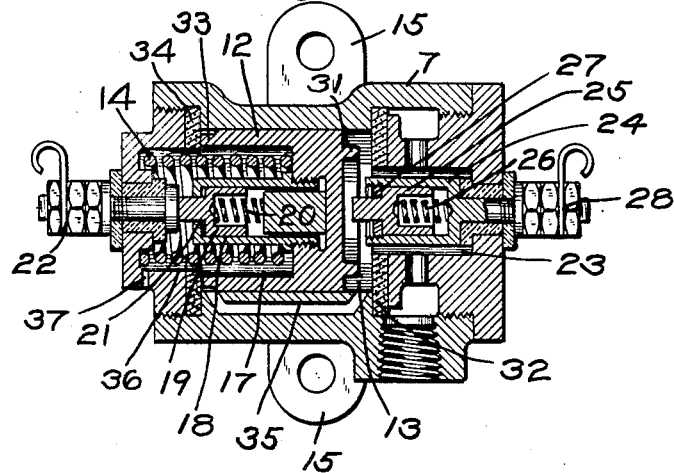
INVENTOR
HENRY D. HUKILL
BY *Wm. M. Cady*
ATTORNEY Patented Mar. 22, 1932

1,850,626

UNITED STATES PATENT OFFICE

HENRY D. HUKILL, OF PITTSBURGH, PENNSYLVANIA, ASSIGNOR TO THE WESTING-HOUSE AIR BRAKE COMPANY, OF WILMERDING, PENNSYLVANIA, A CORPORATION OF PENNSYLVANIA

LOW PRESSURE WARNING DEVICE

Application filed September 16, 1929. Serial No. 393,088.

This invention relates to signals and more particularly to signal devices adapted to be used in connection with fluid pressure brake equipments for indicating the amount of fluid pressure available for braking purposes.

Automotive vehicles of the omnibus and heavy duty truck types are now usually provided with fluid pressure operated brakes, since greater braking power is provided by this type of brakes for properly controlling the vehicles on the road, than is obtained from the usual mechanical brakes.

The fluid pressure brake equipment of an automotive vehicle may comprise an air compressor which is coupled directly to the internal combustion engine of the vehicle and a main reservoir for storing the compressed air. Since the air compressor is continuously operated when the internal combustion engine is in operation, whether or not the vehicle is in motion, compressed air will be continuously supplied to the main reservoir as long as the engine is running. However, if a vehicle has been idle for a considerable period of time, the main reservoir may become discharged, through one cause or another. If this is the case and the vehicle is started, the main reservoir pressure may be insufficient to insure the proper application of the brakes until the engine has been run idle for a length of time sufficient to build up the pressure of the fluid in the reservoir to a predetermined amount. Furthermore, excessive use of the brakes while the vehicle is in motion, may result in the reservoir pressure being decreased to a point at which there may be insufficient fluid pressure available for braking purposes.

An object of the present invention is to provide a visible signal device adapted to be used in connection with fluid pressure brake equipment of automotive vehicles for the purpose of indicating whether or not sufficient fluid pressure is available for controlling the brakes.

Another object of the invention is to provide a fluid pressure operated visible signal device.

Another object of the invention is to provide a signal device of the above type in which a plurality of vari-colored electric lights are adapted to be selectively illuminated by means controlled by variations in fluid pressure.

Another object of the invention is to provide an improved signal device of the character mentioned which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawings; Figure 1 is a diagrammatic view of a signal device embodying the invention; and Fig. 2 is a vertical longitudinal section through a portion of the structure shown in Fig. 1.

Referring to the drawings, the signal device may comprise a main reservoir 6, a switch device 7, a clear electric lamp 8, a colored electric lamp 9, a source of electric current, such as a storage battery 10, and an ignition circuit controlled by a switch 11.

The main reservoir 6 may be supplied with fluid under pressure from a suitable source of supply, such as an air compressor (not shown) driven by the engine of the vehicle.

The switch device 7 may comprise a valve piston 12 contained in a chamber 13, said valve piston being adapted to seat upon extreme movement in either direction and is subject on one side to the pressure of a spring 14.

The casing of the switch device 7 is formed with diametrically disposed projections 15 which provide ears by means of which the switch device may be attached to the frame 16 of the vehicle (only a portion of which is shown).

On its spring side, the valve piston 12 is recessed, as at 17, and mounted in said recess and surrounded by the spring 14, is a cylinder 18 containing a plunger 19 which is subject on its inner end by the pressure of a spring 20, contained in the cylinder 18. The forward portion of the plunger 19 is reduced in diameter and projects through an opening 21 formed in the outer end wall of the cylinder 18.

The end wall of the switch device 7 adjacent to the plunger 19, is provided with a terminal 22, which is insulated from the casing, as shown.

Formed in the opposite end of the switch device 7, is a chamber 23, in which is mounted a cylinder 24 containing a plunger 25, subject on one side to the pressure of a spring 26. The inner end of the plunger 25 is reduced in diameter and projects through an opening 27 in the inner end wall of the cylinder 24. The opposite end of the cylinder 24 is provided with a terminal 28, which is insulated from the casing, as shown.

The terminal 22 is connected by a wire 38 to one terminal of the lamp 8, the other terminal of said light being connected by a wire 39 to the wire 40 from the switch 11 to the ignition apparatus (not shown) of the vehicle.

The terminal 28 is connected by a wire 41 to one terminal of the lamp 9, the other terminal of said light being connected to the wire 39.

In this way the lamps 8 and 9 are connected in parallel with the ignition circuit of the vehicle.

If so desired, the lamps 8 and 9 may be located on the instrument board of the vehicle in front of the operator.

Since the casing of the switch device 7 is attached to the frame 16 of the vehicle, the plungers 19 and 25, cooperating with the terminals 22 and 28 respectively, provide flexible contacts through which the circuits of the lights 8 and 9 are connected to ground, depending upon the position of the piston 12.

For instance, with the pressure of the fluid in the main reservoir 6 above a predetermined amount, the piston 12 will be so disposed in the chamber 13, that the circuit of the light 9 will be open, while the circuit of the light 8 will be closed. Therefore, the light 8 will be illuminated. However, when the reservoir pressure falls below a predetermined amount, the piston 12 is shifted, so that the circuit of light 8 is open, while the circuit of the light 9 is closed, the piston being automatically operated by variations in the reservoir pressure from a predetermined point.

In operation, with the ignition switch 11 closed, and assuming that the pressure of the fluid in the reservoir 6 is below a predetermined amount, piston 12 will be shifted to the right by the pressure of the spring 14 so that the seat rib 31 seals against the seat provided by gasket 32 and cuts off communication between chambers 13 and 23.

In this position the inner end of the plunger 25 engages the adjacent portion of the piston 12, thereby completing the circuit through the light 9 to ground, provided by the frame 16, so that said light is illuminated.

In as much as the light 9 is designed to warn the operator when the pressure of the fluid in the reservoir 6 is low, such light will remain illuminated as long as the piston 12 remains sealed against the gasket 32.

With the vehicle engine (not shown) running, the air compressor attached to the engine and operated thereby will supply compressed air to the reservoir 6, through pipe 29, and from the reservoir, the air will flow through pipe 30 to the chamber 23 of the switch device 7, building up a pressure against the inner seated area of piston 12 equivalent to the pressure of the fluid in the reservoir.

When the pressure of the fluid against the inner seated area of the piston 12 is increased a predetermined amount, the piston will be unseated and the pressure of the fluid acting on the larger exposed area of the piston will quickly force the piston toward the left against the pressure of the spring 14. This movement withdraws the piston from the projecting end of the plunger 25 so that the circuit of the light 9 is opened.

In the movement of the piston 12 to the left, seat rib 33 on the left side of the piston will seal against the seat provided by gasket 34, and the plunger 19 will engage the terminal 22, thereby closing the circuit of light 8 to the ground, as provided by the frame 16. The piston will remain seated against the gasket 34 as long as the predetermined operating pressure is present in the reservoir 6.

Should the pressure in the reservoir 6 fall below a predetermined amount, the force of the spring 14 will move the piston 12 away from the gasket 34, thereby breaking the seal at the left side of the piston and permitting the pressure of the fluid in chamber 13 to vent to the atmosphere through passage 35, chamber 36 and port 37. The port 37 being restricted, will allow the pressure to build up in recess 17 against the spring side of the piston 12 and assist the spring 14 in shifting the piston to its seat against the gasket 32. This movement of the piston withdraws the plunger 19 from the inner end of the terminal 22, thereby opening the circuit of the light 8, while at the opposite side, the head of the piston engages the projecting end of the plunger 25, thereby closing the circuit of the light 9.

With the light 8 indicating normal operating pressure of the fluid in the reservoir 6 and the light 9 indicating sub-normal operating pressure, when the ignition switch 11 of the vehicle is closed, either the light 8 or the light 9 will be illuminated, through the switch device 7, so that the operator can tell at a glance whether or not there is sufficient fluid pressure available in the main reservoir for operating the brakes of the vehicle.

While one illustrative embodiment of the invention has been described in detail, it is not my invention to limit its scope to that embodiment or otherwise than by the terms of the appended claims.

Having now described my invention, what I claim as new and desire to secure by Letters Patent, is:

1. A pressure operated switch comprising a casing, a valve piston contained therein, a chamber on one side of said valve piston connected to a source of fluid under pressure, a spring on the opposite side of said valve piston opposing the pressure of the fluid in said chamber, a contact member carried by said valve piston on the spring side thereof, a terminal member adapted to be engaged by said contact member when the pressure of the fluid in said chamber exceeds the spring pressure, and a terminal contact member on the opposite side of said valve piston adapted to be engaged by said valve piston when the spring pressure exceeds the pressure of the fluid in said chamber.

2. A pressure operated switch comprising a casing, a valve piston contained therein, a chamber on one side of said valve piston connected to a source of fluid under pressure, a spring on the opposite side of said valve piston opposing the pressure of the fluid in said chamber, a spring-pressed contact member carried by said valve piston on the spring side thereof, a terminal member adapted to be engaged by said contact member when the pressure of the fluid in said chamber exceeds the spring pressure, and a spring-pressed terminal contact member mounted in said chamber and adapted to be engaged by said valve piston when the spring pressure exceeds the pressure of the fluid in said chamber.

In testimony whereof I have hereunto set my hand, this 11th day of September, 1929.

HENRY D. HUKILL.